Patented Dec. 28, 1926.

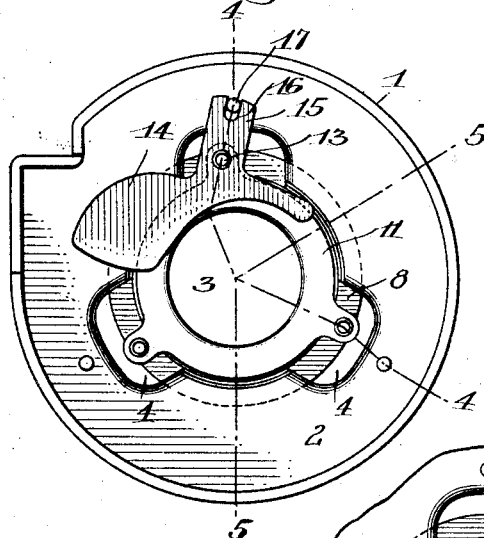
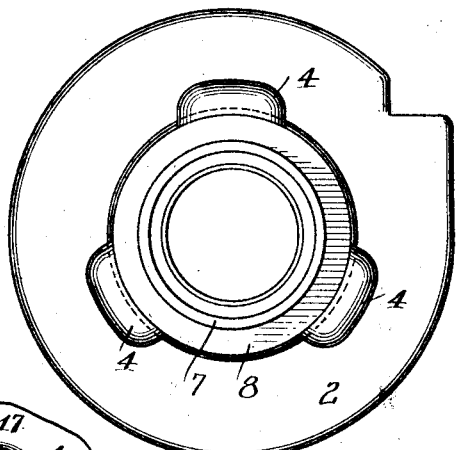
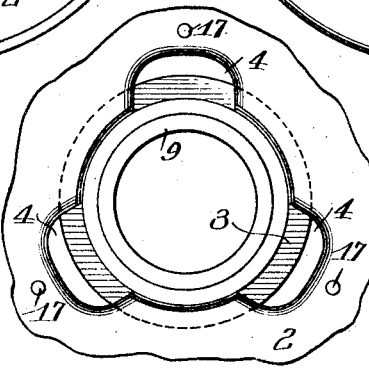
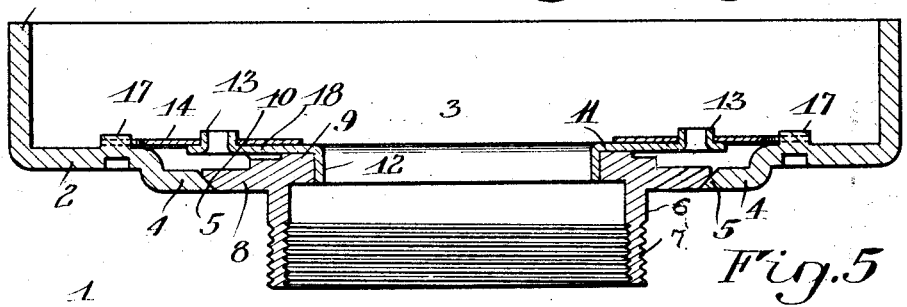
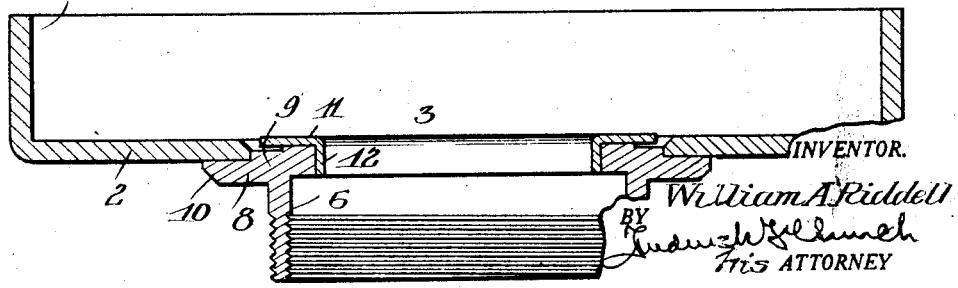

1,612,745

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

CASE FOR PHOTOGRAPHIC SHUTTERS.

Application filed August 5, 1925. Serial No. 48,382.

My present invention relates to photography and more particularly to photographic shutters of the modern annular type embodying a casing that is screwed onto the lens tube of a camera. It is convenient to form the shutter casing proper independently of the collar that joins it to the camera front and the invention has for its object to provide a simple and improved construction whereby these parts are assembled and secured together. A further object of the invention is to provide a joint which will lend itself to the convenience of the parts operating within the casing. To these and other ends the invention resides in certain improvements and combinations of parts all as will be hereinafter more fully described, the novel features being pointed out in the claims at the end of the specification.

In the drawings:

Figure 1 is a front view of the interior of a shutter casing constructed in accordance with and illustrating one embodiment of my invention, a portion of the blade mechanism only being shown in place;

Figure 2 is a rear view of the casing;

Figure 3 is a fragmentary front view of the bottom of the casing with the blade mechanism removed;

Figure 4 is an enlarged section on the line 4—4 of Figure 1;

Figure 5 is an enlarged section on the line 5—5 of Figure 1.

Similar reference numerals throughout the several views indicate the same parts.

As before stated, the present invention relates primarily to the construction of the shutter case which may contain any desired operating mechanism. It comprises an annular cup shaped main casing 1 having a bottom or rear wall 2. In the practice of my present invention I bump out at equally spaced intervals around the central exposure opening 3 a plurality of downwardly or rearwardly offset flanges 4. In the present instance there are three of these. The inner edges thereof, that is, the edges which project toward the center are preferably chamfered as indicated at 5 in Figure 4.

The rear lens tube or collar 6, threaded at 7 for attachment to the shutter body or front is provided at its own front portion with a circumferential flange 8 that rests against the bottom or rear side 2 of the casing 1 as clearly shown in Figure 5. It does so in the intervals between the lugs or flanges 4 and preferably the lens tube has a boss 9 that fits into the central opening of the case 1 to center it. The edges of the flange 8 are also chamfered in a complementary manner to the lugs 4 on the case so that the flange 8 is locked in a rearward direction against the flanges 4 as shown in Figure 4, and in a forward direction against the bottom of the case as shown in Figure 5.

The manner in which this is accomplished is by bending the lugs 4 rearwardly at an angle in the formation of the casing 1 as indicated in dotted lines in Figure 3. The tube 6 is then applied against the rear side of the bottom 2 of the case as shown in Figure 5 after which the lugs 4 are bent forwardly against the flanges of the lens tube locking it securely in place against both forward and rearward movement.

Referring to Figures 1 and 4, a blade operating ring 11 that has a bearing against the boss 9 is provided with a collar 12 that fits within and also has a bearing against the central opening of the lens tube 6. At points coincident with the depressions formed by the lugs 4 that is provided with tubular pivots 13 struck out therefrom and carrying the shutter blades 14. There are three of these blades only one of which is shown but each is provided with an extension 15 having a slot 16 engaging a pin 17 struck up from the bottom 2 of the shutter case 1 so that as the blade ring 11 is rotated it opens and closes the blades in a well known manner. The point is that, with the offset interlocking of the lugs 4 on the case bottom 2 and the flange 8 of the lens tube 6, the ring 11 is permitted to lie with its upper face practically flush with the bottom or rear wall surface 2 of the casing 1, the depressions formed by the offsets 4 giving room for the blade ring extensions 18 which carry the pivot 13 so that the blades 14 themselves lie flat against the bottom or rear surface 2 of the casing 1.

I claim as my invention:

1. In a photographic shutter, the combination with a main shutter casing having a plurality of rearwardly offset lugs on the rear wall thereof forming depressions in the bottom of the casing, of a rear lens tube having portions engaging forwardly against the said rear wall of the casing and locked in position at the rear by the said lugs, a blade ring having a bearing in the lens tube and having extensions movable in the said depressions and shutter blades turning on the bottom of the casing forwardly of and actuated by the extensions on the blade ring.

2. In a photographic shutter, the combination with a main casing having a central opening and a plurality of rearwardly offset lugs adjacent to said opening, of a rear lens tube having a boss fitting in the central opening of the casing and also provided with a flange lying against the rear wall of the casing at the front and locked in position by the engagement of the lugs at the rear, the lugs providing a plurality of recesses in the bottom of the main casing and said lugs being in substantially the same plane as the flange on the lens tube, a blade ring having a bearing in the boss of the lens tube and having extensions operating in the recesses aforesaid, and a plurality of shutter blades arranged on the bottom of the main casing forwardly of the blade ring and operatively connected to the extensions on the latter.

WILLIAM A. RIDDELL.